United States Patent [19]

Reipert et al.

[11] Patent Number: 5,146,883
[45] Date of Patent: Sep. 15, 1992

[54] PISTON AND CONNECTING ROD ASSEMBLY

[75] Inventors: Peter Reipert, Stuttgart; Arno Kolb, Offenau; Siegfried Mielke; Tjark Coners, both of Neckarsulm, all of Fed. Rep. of Germany; Dean Reichenbach, Kolumbus, Ind.

[73] Assignee: Kolbenschmidt Aktiengesellschaft, Neckarsulm, Fed. Rep. of Germany

[21] Appl. No.: 703,563

[22] Filed: May 21, 1991

[30] Foreign Application Priority Data

May 24, 1990 [DE] Fed. Rep. of Germany ....... 4016723

[51] Int. Cl.[5] ............................................... F02F 3/00
[52] U.S. Cl. .................................. 123/193.6; 92/212; 92/187
[58] Field of Search ............... 123/193 P; 92/187, 212, 92/213, 222, 223, 157

[56] References Cited

U.S. PATENT DOCUMENTS

| | | | |
|---|---|---|---|
| 4,459,700 | 7/1984 | LaBouff | 92/187 |
| 4,498,219 | 2/1985 | Ban et al. | 92/212 |
| 4,531,269 | 7/1985 | LaBouff | 92/212 |
| 4,548,126 | 10/1985 | Donomoto et al. | 92/213 |
| 4,643,078 | 2/1987 | Ban | 92/212 |
| 4,648,308 | 3/1987 | Matsui et al. | 92/212 |
| 4,679,493 | 7/1987 | Munro et al. | 92/222 |
| 4,746,582 | 5/1988 | Tsuno | 92/212 |
| 4,942,804 | 7/1990 | Matsuura et al. | 92/212 |

FOREIGN PATENT DOCUMENTS 0069579  10/1984  European Pat. Off. .
3214093  10/1983  Fed. Rep. of Germany ........ 92/212

Primary Examiner—E. Rollins Cross
Assistant Examiner—M. Macy
Attorney, Agent, or Firm—Sprung Horn Kramer & Woods

[57] ABSTRACT

In a piston and connecting rod assembly for internal combustion engines, which assembly comprises a spherical small end portion, which is movably mounted in a recess of the piston head and in a retaining ring and which is connected to the skirt of the piston, the load-carrying capacity of the piston, which consists of a pressure-cast aluminum alloy, is increased in that the piston is reinforced by fibers, and a ring carrier which has open pores and is embedded in the ring-carrying portion and is connected thereto by a metallic bond, and a collar serving as an abutment for the retaining ring is integrally cast with the piston skirt on the inside thereof.

15 Claims, 1 Drawing Sheet

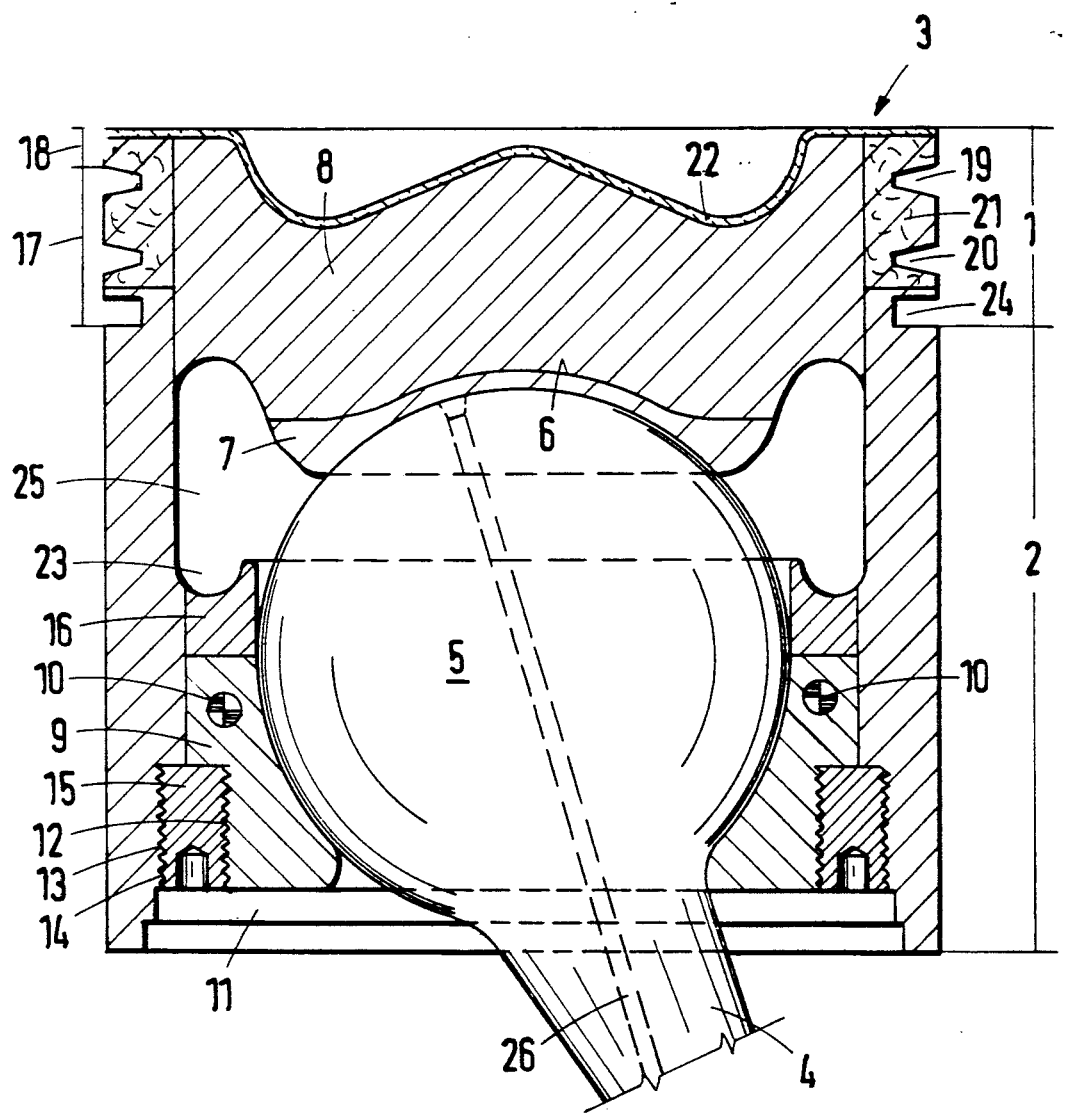

PISTON AND CONNECTING ROD ASSEMBLY

DESCRIPTION

This invention relates to a piston and connecting rod assembly for internal combustion engines, comprising a cast piston, which includes top and bottom parts and is made of an aluminum alloy used in making pistons, and a spherical small end portion, which on that side that is remote from the connecting rod is movably mounted in a spherical segment-shaped recess formed in the bottom surface of the piston head and which adjacent to the connecting rod is movably mounted in a hingelike retaining ring, which is detachably connected to the skirt of the piston.

Such piston and connecting rod assemblies distinguish by ensuring a satisfactory straight guidance of the piston, by a relatively short piston skirt, by a thermal expansion which is absolutely symmetrical with respect to the axis, and by a small clearance between the piston and the inside surface of the cylinder.

EP-R-0 069 579 discloses a piston and connecting rod assembly in which the piston head is constituted by a cylindrical member, which is made of a refractory material and is inserted in a hollow-cylindrical piston skirt and on its inside surface has a spherical segment-shaped recess, in which that side of the spherical small end portion which is remote from the connecting rod is movably mounted. To hold the small end portion in the spherical segment shaped recess, that small end portion is movably mounted in a hingelike retaining ring, which embraces the zone which surrounds the connecting rod. However, that piston is not suitable for use in heavy-duty diesel engines for utility vehicles.

It is an object of the present invention to provide for diesel engine for utility vehicles a heavily loadable piston and to ensure a low oil consumption through a long useful life and optimum conditions for a low fuel consumption and a minimized emission of polluants as well as a high fatigue limit under ignition pressures up to and above 200 bars.

That object is accomplished in that the light alloy piston has been made by pressure diecasting, its top and bottom parts consist of a fiber-containing composite material, the ring-carrying portion has embedded therein a ring carrier, which is joined to the piston body by a metallic bond and has open pores which are completely filled with the aluminum alloy of the piston, the top part has a fiber-free layer which adjoins the spherical segment-shaped recess, and a collar which serves as an abutment for the retaining ring is integrally cast with the bottom part on the inside of the latter.

In accordance with a further feature the bottom part of the piston is a shrunk-on fit on the retaining ring, which preferably consists of grey cast iron and which is additionally retained by a screw-threaded ring, which consists of the fiber-reinforced aluminum alloy used in the piston and is screwed in above the pilot portion of the bottom part. Because the bottom part of the piston is a shrunk-on fit on the retaining ring the latter serves also as an expansion control element, which ensures that the bottom part of the piston will be circular under all operating conditions.

To facilitate the mounting of the spherical skirt end, the retaining ring consists of two segments, which after they have been mounted are interconnected by pins inserted into mating bores.

In order to minimize the fuel consumption and the emission of polluants and to ensure an optimum protection of the compression rings by an arrangement of the ring-carrying portion on a higher level, the short top land having a height of about 5 to 10% of the piston diameter and defining a continuously small clearance and the first and second compression ring grooves are adjoined by a double ring carrier.

A fine adjustment of the clearance of the top part of the piston is permitted by the satisfactory straight guidance of the bottom part of the piston. The arrangement of the ring zone in a higher position will ensure a guidance of the skirt over a larger length.

A ceramic coating on the piston head may consist of a layer having a thickness of about 0.5 to 5 mm, preferably 1 to 2 mm, and consisting, e.g., of partly stabilized ziroconium dioxide or aluminum titanate so that the piston and particularly its ring-carrying portion is sufficiently shielded against the heat flux.

The annular clearance provided in the region between the underside of the piston head and the collar disposed on the inside of the bottom part of the piston serves as a cooling passage, which in accordance with a further feature of the invention extends to a level which is close to the plane which extends through the lower side face of the oil ring groove.

To produce a shaking action of the cooling oil in the cooling passage, that circular ring-shaped surface of the collar which faces the piston head constitutes a trough.

The ring carrier suitably consists of cold-pressed shavings of austenitic cast iron or of a highly porous sintered material based on nickel or chromium-nickel.

The invention will be described more in detail and by way of example in the drawing, which is a sectional view taken on the piston axis of a piston in accordance with the invention for internal combustion engines.

The piston and connecting rod assembly in accordance with the invention comprises a piston 3 and a spherical small end portion 5. The piston 3 is made of a piston alloy of the type AlSi 12CuNiMg by squeeze casting and comprises a fiber-reinforced reinforced top portion 1 and a skirt 2. The small end portion 5 is connected to the connecting rod 4. On that side which is remote from the connecting rod 4 the small end portion 5 is movably mounted in a spherical segment-shaped recess 6 formed in the underside surface of the piston head 8, which adjacent to that recess has a fiber-free portion 7. That region of the small end portion 5 which adjoins the connecting rod 4 is retained by a hingelike retaining ring 9, which is made of grey cast iron and is a shrunk-in fit in the piston skirt 2 and consists of two halves, which are interconnected by cylindrical pins 10. The outside peripheral surface of the bottom portion of the retaining ring 9 and the inside peripheral surface of the piston skirt are formed with two mutually opposite, turned recesses 12, 13 disposed above the pilot portion 11. The recess 13 in the piston skirt is formed with screw threads 14. A screw-threaded ring 15 made of a fiber-reinforced piston alloy has been screwed into the hollow-cylindrical groove which is constituted by the turned recesses 12 and 13 in such a manner that the retaining ring 9 is forced against the collar 16, which is provided on the inside surface of the piston skirt 2 and has integrally been cast therewith. A double ring carrier 21 which is made of cold-pressed shaving of austenitic cast iron material is embedded in the cast material of the ring-carrying portion 17 and of the top land 18 and extends in the top land 18 and on the opposite sides of the first and second compression ring grooves 19 and 20 and is joined to the piston material by a metallic bond and gas pores filled by the piston material. A heat insulating layer 22 which consists of zirconium dioxide and has a thickness of 2 mm has been applied to the piston head 8. The annular clearance 25 which extends between the bottom surface of the piston head 8 and the trough 23 formed by the top surface of the collar, extends to a level which is slightly below the plane which includes the bottom side face of the oil ring groove 24 and serves as a cooling passage for the lubricating oil, which serves as a coolant. Through the bore 26 which extends through the connecting rod 4 and the small end part 5, lubricant is supplied to the lubricating gap disposed between the recess 6 and the small end part 5.

It will be understood that the specification and examples are illustrative but not limitative of the present invention and that other embodiments within the spirit and scope of the invention will suggest themselves to those skilled in the art.

What is claimed is:

1. In a piston and connecting rod assembly for an internal combustion engine, comprising an aluminum alloy cast piston which includes top and bottom parts and a spherical small end portion formed on the upper end of the connecting rod a spherical segment-shaped recess formed in the bottom surface of the piston head and surrounding the spherical end portion of the connecting which is movably mounted in a hingelike retaining ring detachably connected to the skirt of the piston, the improvement wherein the piston (3) is made by squeeze casting and the whole piston is reinforced by fibers except that the top part is free of fibers in a layer (7) which adjoins the spherical segment-shaped recess (6) in the bottom surface of the piston head (8), the assembly including a ring carrier (21) which has open pores completly filled with the aluminum alloy of the piston, the ring carrier being embedded in the ring-carrying portion (17) and joined thereto by a metallic bond, and a collar (16) serving as an abutment for the retaining ring (9) is integrally cast with the bottom part on the inside of the bottom part.

2. A piston and connecting rod assembly according to claim 1, wherein the bottom part (2) is a shrunk-on fit on the retaining ring (9).

3. A piston and connecting rod assembly according to claim 1, wherein the retaining ring (9) is of grey cast iron.

4. A piston and connecting rod assembly according to claim 1, wherein the retaining ring (9) comprises two segments.

5. A piston and connecting rod assembly according to claim 1, wherein screw threads (14) are provided above a pilot portion (11) of the bottom part (2) and a screw-threaded ring (15) is screwed into said screw threads (14) to force the retaining ring (9) against the collar (16).

6. A piston and connecting rod assembly according to claim 5, wherein the screw-threaded ring (15) is of the fiber-reinforced aluminum alloy used in the piston.

7. A piston and connecting rod assembly according to claim 1, including a double ring carrier (21) which extends in the top land (18) and on opposite sides of the first and second compression ring grooves (19, 20).

8. A piston and connecting rod assembly according to claim 1, including a heat-insulating layer (22) made of ceramic material applied to the piston head (8).

9. A piston and connecting rod assembly according to claim 8, wherein the heat insulating layer (22) has a thickness of 0.5 to 5 mm.

10. A piston and connecting rod assembly according to claim 9, wherein the heat insulating layer (22) has a thickness of 1 to 2 mm and is made of aluminum titanate or zirconium dioxide.

11. A piston and connecting rod assembly according to claim 1, wherein there is provided an annular clearance (25) between the underside of the piston head (8) and the collar (16) on the bottom part (2) of the piston (3) which annular clearance serves as a cooling passage.

12. A piston and connecting rod assembly according to claim 11, wherein the annular clearance (25) extends into the piston head (8) to a level which is slightly below the plane which defines the bottom side face of an oil ring groove (24).

13. A piston and connecting rod assembly according to claim 11, wherein the top surface of the collar (16) constitutes a trough (23).

14. A piston and connecting rod assembly according to claim 1, wherein the ring carrier (21) is formed of cold-pressed shavings of austenitic cast iron.

15. A piston and connecting rod assembly according to claim 1, wherein the ring carrier (21) is formed of a highly porous sintered material based on nickle and chromium-nickel.

* * * * *

UNITED STATES PATENT AND TRADEMARK OFFICE
CERTIFICATE OF CORRECTION

PATENT NO. : 5,146,883

DATED : September 15, 1992

INVENTOR(S) : Reipert et al.

It is certified that error appears in the above-identified patent and that said Letters Patent is hereby corrected as shown below:

Title Page     U.S. PATENT DOCUMENTS: Delete " 4,459,700 " and substitute -- 4,459,900 --

Col. 3, line 28   After " rod " insert -- , --

Col. 3, lines 31-32   After " connecting " insert -- rod --

Signed and Sealed this

Thirty-first Day of May, 1994

*Attest:*

BRUCE LEHMAN

*Attesting Officer*     *Commissioner of Patents and Trademarks*